(12) United States Patent
Sako et al.

(10) Patent No.: US 7,242,654 B2
(45) Date of Patent: Jul. 10, 2007

(54) DATA RECORDING MEDIUM, DATA RECORDING METHOD AND APPARATUS AND DATA REPRODUCING METHOD AND APPARATUS

(75) Inventors: Yoichiro Sako, Tokyo (JP); Tomihiro Nakagawa, Kanagawa (JP); Tatsuya Inokuchi, Tokyo (JP)

(73) Assignee: Sony Corporation (JP)

( * ) Notice: Subject to any disclaimer, the term of this patent is extended or adjusted under 35 U.S.C. 154(b) by 622 days.

(21) Appl. No.: 10/333,644

(22) PCT Filed: May 24, 2002

(86) PCT No.: PCT/JP02/05080

§ 371 (c)(1),
(2), (4) Date: Mar. 10, 2003

(87) PCT Pub. No.: WO02/095749

PCT Pub. Date: Nov. 28, 2002

(65) Prior Publication Data
US 2003/0161233 A1 Aug. 28, 2003

(30) Foreign Application Priority Data
May 24, 2001 (JP) ............................. 2001-155960

(51) Int. Cl.
*G11B 5/58* (2006.01)
*G11B 7/00* (2006.01)
(52) U.S. Cl. ................................. 369/53.22; 369/47.24
(58) Field of Classification Search .................. None
See application file for complete search history.

(56) References Cited

U.S. PATENT DOCUMENTS

| 6,212,145 | B1 * | 4/2001 | Oohata et al. | 369/53.22 |
| 6,973,015 | B1 * | 12/2005 | Murakami et al. | 369/47.21 |
| 2002/0097648 | A1 * | 7/2002 | Ilda | 369/47.39 |
| 2004/0151098 | A1 * | 8/2004 | Nagano et al. | 369/53.21 |

* cited by examiner

*Primary Examiner*—William Korzuch
*Assistant Examiner*—Adam R. Giesy
(74) *Attorney, Agent, or Firm*—Lerner, David, Littenberg, Krumholz & Mentlik, LLP

(57) ABSTRACT

A data recording medium has plural recording areas. The recording medium includes a first recording area for recording data allocated with address data, a second recording area for recording data having allocated address data different from the address data allocated to the data recorded in the first recording area, and identification data recorded in the second recording area for discriminating the first and second recording areas from each other.

5 Claims, 6 Drawing Sheets

| MOVEMENT NUMBER TNO 00 | POINT | MINUTE MIN 00~74 | SECOND SEC 00~59 | FRAME NUMBERS FRAME 00~74 | ZERO | MINUTE PMIN 00~74 | SECOND PSEC 00~59 | FRAME NUMBERS PFRAME 00~74 |
|---|---|---|---|---|---|---|---|---|
| | | TIME ELAPSED IN MOVEMENT (TIME) | | | | ABSOLUTE TIME OF POINT CONTENTS (PTIME) | | |
| 8 | 8 | 8 | 8 | 8 | 8 | 8 | 8 | 8 |

[bit]

FIG.2

| MOVEMENT NUMBER TNO 01~99 | INDEX X 01~99 | MINUTE MIN 00~74 | SECOND SEC 00~59 | FRAME NUMBERS FRAME 00~74 | ZERO | MINUTE AMIN 00~74 | SECOND ASEC 00~59 | FRAME NUMBERS AFRAME 00~74 |
|---|---|---|---|---|---|---|---|---|
| | | TIME ELAPSED IN MOVEMENT (TIME) | | | | ABSOLUTE TIME (ATIME) | | |
| 8 | 8 | 8 | 8 | 8 | 8 | 8 | 8 | 8 |

[bit]

FIG.3

| MOVEMENT NUMBER TNO 00 | POINT | MINUTE MIN 00~74 | SECOND SEC 00~59 | FRAME NUMBERS FRAME 00~74 | TIME HOUR 00~15 | TIME HOUR 00~15 | MINUTE PMIN 00~74 | SECOND PSEC 00~59 | FRAME NUMBERS PFRAME 00~74 |
|---|---|---|---|---|---|---|---|---|---|
| | | TIME ELAPSED IN MOVEMENT (TIME) | | | | | ABSOLUTE TIME OF POINT CONTENTS (PTIME) | | |
| 8 | 8 | 8 | 8 | 8 | 4 | 4 | 8 | 8 | 8 |

[bit]

FIG.4

DATA RECORDING MEDIUM, DATA RECORDING METHOD AND APPARATUS AND DATA REPRODUCING METHOD AND APPARATUS

BACKGROUND OF THE INVENTION

This invention relates to a data recording medium, having plural recording areas thereon, a data recording method and apparatus for recording data on this recording medium, and a data reproducing method and apparatus for reproducing data recorded by the data recording method and apparatus.

Among certain multi-section optical discs, provided with a plural number of sections, each including a lead-in area, a program area and a lead-out area, there is such a one in which continuous addresses are provided across plural sections. Among other multi-section optical discs, there is such a one in which self-complete addresses are provided from one section to the next.

However, in an optical disc in which addresses lie across plural sections, it is necessary to ultimately match the addresses in authoring, by an extremely laborious operation, so that the addresses will be continuous from one section to the next. If addresses self-complete on the section basis are used, address data read out from the optical disc in reproducing the optical disc become the same in each section, such that there is a risk that it becomes impossible to discern from address data from which optical disc the address data in question has been read out.

In Japanese Laid-Open Patent Publication No-H-11-213562, there is disclosed an optical disc in which data is recorded on the inner rim side section with the same format as that used in the Compact Disc and in which data is recorded on the outer rim side section at a recording density higher than on the inner rim side section. In this optical disc, addresses are accorded in continuation from a program area of the outer rim side section to the lead-out area of the inner rim side section, while addresses which are based on the time information not used in the inner rim side section are used in the lead-in area on the outer rim side section.

In this optical disc, in which the addresses are accorded in continues fashion from the program area of the outer rim side section to the leadout area of the inner rim side section, it becomes difficult to discern which section is currently reproduced.

If there is a single-section optical disc in which the same format is used for the inner rim side section as that used for the outer rim side section in which the data is recorded with a high recording density, that is such a single-section optical disc in which data has been recorded at the high recording density in both the inner and outer rim areas, it is not possible for a reproducing apparatus to discern the single-section optical disc from an optical disc having the inner rim side section and the outer rim side section having the recording density higher than the recording density of the inner rim side section, if based solely on address data read out from the optical disc.

SUMMARY OF THE INVENTION

It is an object of the present invention to provide a data recording medium which, while allowing for authoring on the section basis by independently addressing the respective sections, also allows for discerning which section is being reproduced at the time of reproduction.

It is another object of the present invention to provide a data recording method and apparatus which, while allowing for authoring on the section basis by independently addressing the respective sections, also allows for discerning which section is being reproduced at the time of reproduction.

It is yet another object of the present invention to provide a data reproducing method and apparatus in which, with a recording medium in which addressing has been made independently from section to section to permit independent authoring, the possible presence of identification data is detected at the time of reproduction to permit discrimination as to which section is currently reproduced.

For accomplishing the above objects, the present invention provides a recording medium including a first recording area, a second recording area in which data having allocated address data different from address data allocated to data recorded in the first recording area is recorded, and identification data recorded in the second recording area for distinguishing the first recording area and the second recording area from each other.

The present invention also provides a reproducing apparatus for a recording medium including a head unit for reading out data from a recording medium, the recording medium including a first recording area in which data is recorded in a first format, a second recording area in which data is recorded in a second format different from the first format, and in which data having allocated address data different from the address data allocated to the data of the first format is recorded, and identification data recorded in the second recording area for distinguishing the first and second recording areas from each other, an extraction unit for extracting the identification data from the data read out from the recording medium by the head unit, a first decoder for decoding data read out by the head unit from the first recording area, a second decoder for decoding data read out by the head unit from the second recording area, and a switching controlling unit for supplying data read out by the head unit from the recording medium to the second decoder if the identification data extracted from the extraction unit indicates the second recording area.

The present invention also provides a method for reproducing a recording medium including reading out data from a recording medium, the recording medium including a first recording area in which data is recorded in a first format, a second recording area in which data is recorded in a second format different from the first format and in which data having allocated address data different from the address data allocated to the data recorded in the first recording area is recorded, and identification data recorded in the second recording area for distinguishing the first and second recording areas from each other, and supplying the data read out from the recording medium to a first decoder, adapted for decoding the data read out from the first recording area based on the identification data from the data read out from the recording medium, or to a second decoder adapted for decoding the data read out from the second recording medium.

The present invention also provides a recording apparatus for a recording medium including a laser light source, a first data generating unit for generating data consistent with a first format from data as supplied, a second data generating unit for generating, from the data as supplied, data consistent with a second format different from the first format and identification data, a modulating unit for modulating the laser light from the laser light source based on output data from the first data generating unit or on output data from the second data generating unit, and a head unit including an objective lens for converging the laser light modulated by the modulating unit on a recording medium, the recording medium having formed thereon a first recording area having a first data area based on output data from the first data generating unit and a second recording area having a second data area based on output data from the second data generating unit.

The present invention also provides a method for recording on a recording medium including generating first data consistent with a first format from data as supplied, generating second data consistent with a second format different from the first format and identification data from the data as supplied, modulating the laser light from a laser light source based on output data which is the first data or the second data, converging the modulated laser light by an objective lens on a recording medium, forming a first recording area including a first data area on the recording medium based on the first data, and forming a second recording area including a second data area on the recording medium based on the second data.

Other objects, features and advantages of the present invention will become more apparent from reading the embodiments of the present invention as shown in the drawings.

BRIEF DESCRIPTION OF THE DRAWINGS

FIG. 2 illustrates a data structure of a sub-code (TOC) of a Q-channel recorded in a lead-in area of the inner rim side section.

FIG. 3 illustrates a data structure of the sub-code (TOC) of the Q-channel recorded in a data area and in a lead-in area of the inner rim side section.

FIG. 4 illustrates a data structure of the sub-code (TOC) of the Q-channel recorded in a lead-in area of the outer rim side section.

DETAILED DESCRIPTION

Figure 1:
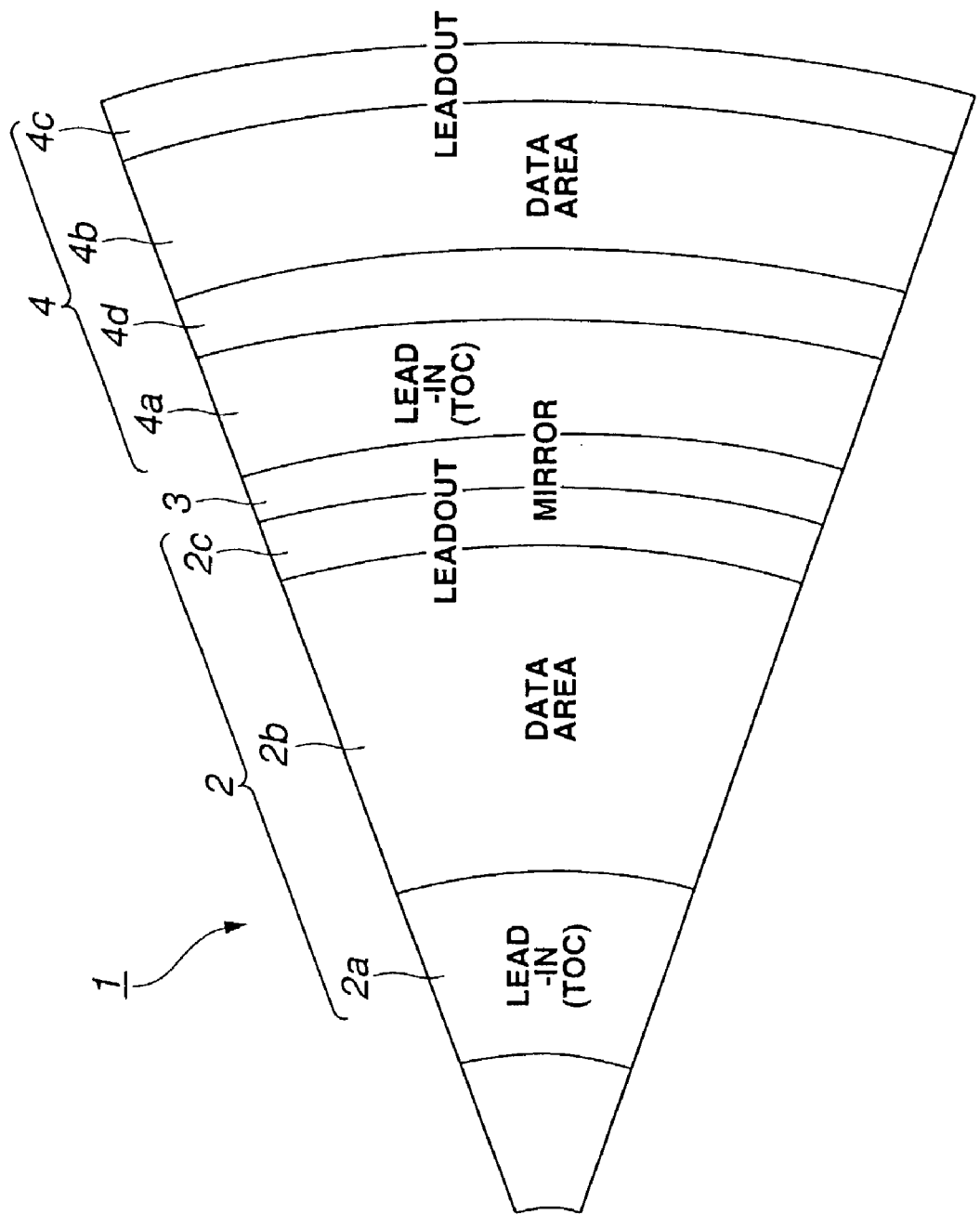
FIG. 1 is a plan view showing a portion of an optical disc embodying the present invention.

Referring to the drawings, an optical disc, a data recording method and apparatus and a data reproducing method and apparatus, according to the present invention, are hereinafter explained in detail.

Referring first to FIG. 1, an optical disc 1 embodying the present invention is explained. This optical disc 1 is a replay-only optical disc, approximately 12 cm in diameter, and has, on its inner rim side, a first section 2, as a first recording area in which data is recorded under the same format as that for the Compact Disc, while having, on an outer rim side of the first section 2, a second section 4, as a second recording area, with the interposition of a signal non-recording area 3, formed by a mirror surface.

The first section 2 is an area in which data is recorded with the same format as that of the Compact Disc, and is made up by a lead-in area 2a for recording TOC (Table-of-contents) data for data recorded in a data area of the first section 2 as later explained, a data area 2b provided next to and on an outer rim side of the lead-in area 2a for recording digital data, such as music number data or computer program data, and a lead-out area 2c provided next to and on an outer rim side of the data area 2b. In this lead-in area 2a, identification data testifying to the presence of the second section 4 in addition to the first section 2, and address data indicating the start position or the leading position of the second section 4, are recorded as a portion of the TOC data.

The second section 4 is an area in which digital data is recorded to a higher density than in the first section 2, such as to a double recording density, and includes a lead-in area 4a, in which there is recorded, e.g., TOC data for data recorded in a data area of the second section 4 as later explained, a data area 4b provided next to the lead-in area 4a for recording therein encoded digital data such as music number data or computer data, and a lead-out area 4c provided next to and on an outer side of the data area 4b. On an inner rim side of the data area 4b of the second section 4 and on an outer rim side of the lead-in area 4a thereof, there is provided a key recording area 4d for recording, e.g., a decryption key for decoding data recorded encrypted in the data area 4b.

In the above-described optical disc 1, contents data are recorded, e.g., in the second section 4, while data relevant to content data, such as advertisement data for contents data recorded in the second section 4, is recorded in the first section 2. This enables the contents data to be reproduced solely by a reproducing apparatus having the function of reproducing the format of the second section 4. If conversely it is attempted to reproduce the optical disc 1 by a reproducing apparatus having solely the function of reproducing the format of the first section 2, solely the advertisement data, for example, recorded in the first section 2, is reproduced, while the contents data recorded in the second section 4 cannot be reproduced. In the second section 4, data are recorded at a recording density higher than in the first section 2, for example at a recording density twice that in the first section. In the second section 4, recording tracks are formed at a track pitch narrower than the track pitch of 1.6 µm of the first section 2, while error correction codes used in the second section are not the same as those used in the first section 2, in a manner of raising the recording density.

Referring to FIG. 2, the data structure of the subcode data of the Q-channel, recorded in the lead-in area 2a of the first section 2, is now explained. In the subcode data of this Q-channel, there are stored data parts pertinent to movement numbers TNO, POINT, time elapsed in the movement TIME, zero and the absolute time PTIME of the POINT contents. The data part pertinent to time elapsed in the movement TIME is represented by a data part relevant to minutes MIN of from 00 to 74, a data part relevant to seconds SEC of from 00 to 59 and a data part relevant to frame numbers FRAME of from 00 to 74. The data part pertinent to the absolute time PTIME of the POINT contents is represented by a data part relevant to minutes PMIN of from 00 to 74, a data part relevant to seconds PSEC of from 00 to 59 and a data part relevant to frame numbers PFRAME of from 00 to 74. An 8-bit data is allocated to each data part of the Q-channel and is represented by BCD, with the entire data being 72-bit data.

For example, if data parts relevant to POINT are from 0 to 99, data relevant to absolute time indicating the beginning position of each movement is recorded in the data part relevant to the absolute time PTIME. When the data part relevant to the POINT is A0, data relevant to the first movement number is recorded in the data part relevant to minutes PMIN pertinent to the absolute time PTIME, while sero is recorded in the data part relevant to seconds PSEC and the data part relevant to PFRAME. When the data part relevant to POINT is A1, data relevant to the last movement number is recorded in the data part relevant to the PMIN of the data part relevant to the absolute time PTIME, while zero is recorded in each data part relevant to PSEC and PFRAME. If the data part pertinent to POINT is A2, data pertinent to the absolute time at which begins the leadout area 2c is recorded in each data part relevant to PMIN, PSEC and PFRAME. In the data part pertinent to the time elapsed TIME, address data are recorded so that the address data will be terminated at 99 minutes 59 seconds 74 frames indicating the maximum recordable time on the Compact Disc.

Referring to FIG. 3, the data structure of Q-channel subcode data recorded in the data area 2b and in the lead-out area 2c of the first section 2 is now explained. In the Q-channel subcode data, there are recorded data parts pertinent to movement numbers TNO, indexes X, time elapsed in a movement TIME, sero and absolute time ATIME. The data parts pertinent to elapsed time TIME in the movement are represented by a data part pertinent to minutes MIN of from 00 to 74, a data part pertinent seconds SEC of from 00 to 59, and a data part pertinent to the frame number FRAME of from 00 to 74. The data part relevant to the absolute time ATIME is represented by a data part relevant to minutes AMIN of from 00 to 74, a data part relevant to seconds ASEC of from 0 to 59 and a data part relevant to frame numbers AFRAME of from 00 to 74. Eight bits are allocated to each of the data parts of the Q-channel subcodes and are represented by BCD, with the total number of bits being 72.

If the data part relevant to the music number TNO is 00, 01–99 or AA, it testifies to the lead-in area, the number of, for example, a movement, or a to lead-in area, respectively. If the data part relevant to an index X is 00 or 00–99, it testifies a pause, or number obtained on subdivision of, for example, a movement. The data part relevant to the time elapsed in a movement TIME begins at a commencing portion of each chapter, that is at sero corresponding to the leading position of each movement. The data part relevant to the absolute time ATIME begins from zero corresponding to the leading end of the data area 2b and is incremented sequentially.

To the second section 4 are allocated address data different from those allocated to the first section 2 as described above. Referring to FIG. 4a, the data structure of the Q-channel subcode data recorded in the lead-in area 4a of the second section 4 is now explained. In the Q-channel subcode data, there are recorded respectively, data parts relevant to the movement number TNO, POINT, time elapsed within a movement TIME, and the absolute time PTIME of the POINT. The data part pertinent to the time elapsed in a movement TIME is represented by a data part relevant to the hour HOUR of from 00 to 15, a data part relevant to minutes MIN of from 00 to 59, a data part relevant to seconds SEC of from 00 to 59, and a data part relevant to the frame number FRAME of from 00 to 74. The data part relevant to absolute time PTIME of the contents of POINT is represented by a data part relevant to hour PHOUR of from 0 to 15, a data part relevant to second PSEC of from 00 to 59, and a data part relevant to frame numbers PFRAME of from 00 to 74.

That is, as compared to the Q channel subcode data of the first section 2, the Q-channel subcode data recorded in the lead-in area of the second section lacks in an area of the data part relevant to zero. There is newly allocated a data part relevant to the hour HOUR of 00 to 15 for the elapsed time in a movement to upper four bits of the eight bits allocated to the data part relevant to sero, whilst there is newly allocated a data part relevant to the hour PHOUR of the absolute time PHOUR for the contents of POINT to the lower four bits of the above eight bits. The reason is that the recording density of the second section 4 is higher than, for example, twice the recording density of the first section 2, and hence the second section 4 is in need of address data indicating the time as the hour HOUR information as address data. Since the hour HOUR and the hour PHOUR have now been added as described above, the data part relevant to the minute MIN and the minute PMIN have now been changed from 00 to 74 of the subcode data of the Q-channel of the first section 2 to 00–59. It should be noted that the Q-channel subcode data recorded in the lead-in area 4a of the second section 4 is similar to the Q channel subcode data recorded in the lead-in area 2a of the first section 2 shown in FIG. 2, except the above-mentioned points, and hence the description of the remaining portions is omitted for simplicity.

Figure 5:
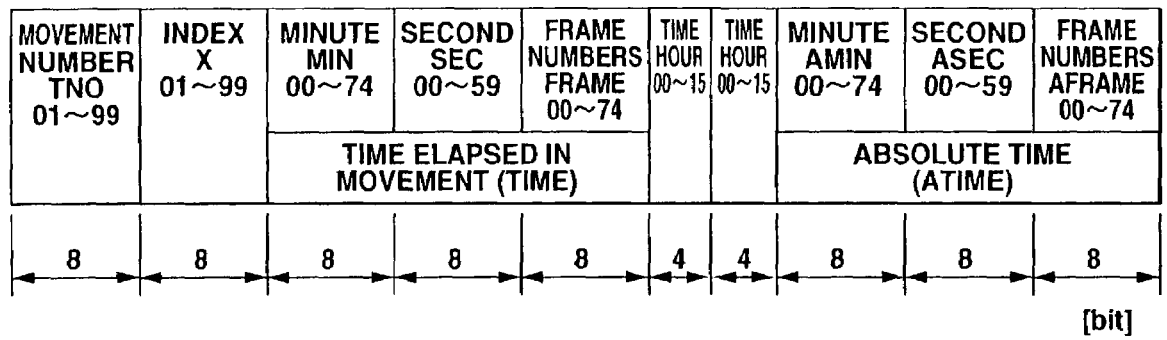
FIG. 5 illustrates a data structure of the sub-code of the Q-channel recorded in a data area and in a lead-out area of the outer rim side section.

Referring to FIG. 5, the data structure of the Q-channel subcode data recorded in the data area 4b and the lead-out area 4c of the second section 4 is hereinafter explained. In this Q-channel subcode data, there are stored respective data parts relevant to the movement number TNO, indexes X, time elapsed in the movement TIME, and absolute time ATIME, in the Q-channel subcode data. The data part relevant to the time elapsed TIME in a movement is represented by a data part relevant to the hour HOUR of from 00 to 15, a data part relevant to minutes MIN of from 00 to 59, a data part relevant to seconds SEC of from 00 to 59 and a data part relevant to a frame number FRAME of from 00 to 74. The data part relevant to absolute time ATIME is represented by a data part relevant to hours AHOUR of 00 to 15, a data part relevant to minutes AMIN of from 0 to 59, a data part relevant to seconds ASEC of from 00 to 59, and a data part relevant to frame numbers AFRAME of from 00 to 74.

That is, the Q-channel subcode data lacks in a sero-data area, as compared to the Q-channel subcode data of the first section 2 shown in FIG. 2. There is newly allocated data pertinent to the hours HOUR of 00 to 15, so far indicating the time elapsed in a movement, to upper four bits of the eight bit data, allocated to this sero data, while there is newly allocated data relevant to the hours AHOUR of the absolute time of from 00 to 15 to the lower four bits. The reason is that, since the recording density of the second section 4 is higher than, for example, twice the recording density for the first section 2, the second section 4 is in need of address data indicating the hours. Since a data part relevant to hours HOUR and time AHOUR is now provided for hours HOUR and for hours AHOUR, the minutes MIN and the minutes AMIN are changed from 00 to 74 of Q-channel subcode data of the first section 2 to 00 to 59. Since Q-channel subcode data recorded in the data area 4b and the lead-out area 4c of the second section 4 is similar to the Q channel subcode data recorded in the data area 2b and in the lead-out area 2c of the first section 2 shown in FIG. 3, except the above-mentioned points, the description of the remaining portions is omitted for simplicity.

Figure 6:
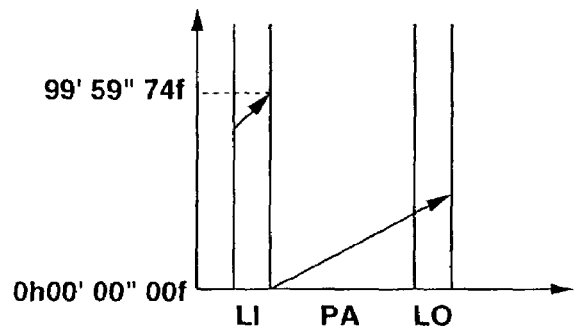
FIG. 6 illustrates the address information of the Compact Disc.

Meanwhile, the subcode data of the Compact Disc. is arranged as shown in FIGS. 2 and 3, and the address data therefor is allocated so as to be sequentially incremented from the inner rim side of to the lead-in area so that the time elapsed TIME as address data for the lead-in area will be terminated at 99 minutes 59 seconds 74 frames as a maximum value of the standard for the Compact Disc, as shown in FIG. 6. In a data area of the Compact Disc, the absolute time ATIME of the data area, that is the address data, is recorded so as to begin at, e.g., zero minute, as it is sequentially incremented from the inner rim side of the data area up to a maximum of 80 minutes.

It should be noted that plural address data are repeatedly recorded in the lead-in area so that TOC data recorded in the innermost rim of the lead-in area will be positively read out by an optical pickup. The address data, recorded as the time information, is offset by an amount corresponding to the length of a unit of repetition.

Figure 7:
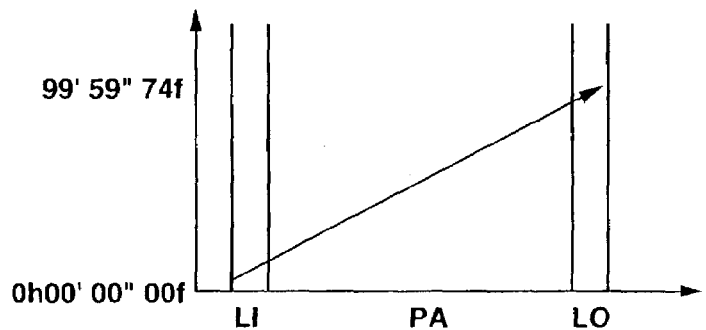
FIG. 7 illustrates the address information of a single-section optical disc in which data has been recorded to a double density in its entire recording area.

The subcode data of a single-section optical disc, in the entire recording area in which data has been recorded at the same high recording density as that for the second section 4, that is at a double recording density, is constructed in the same manner as in the above-described second section 4, as shown in FIGS. 4 and 5. The address data of the subcode data is accorded as the continuous address information to the time elapsed TIME of the lead-in area, data area, and to the absolute time ATIME of the data area and the lead-in area, that is address data, as shown in FIG. 7. That is, in this optical disc, address data incremented from the lead-in area towards the outer rim side, without the beginning address information of the lead-in area becoming minus addresses in order for the start address of the data recording area to begin at 0 minute.

Figure 8:
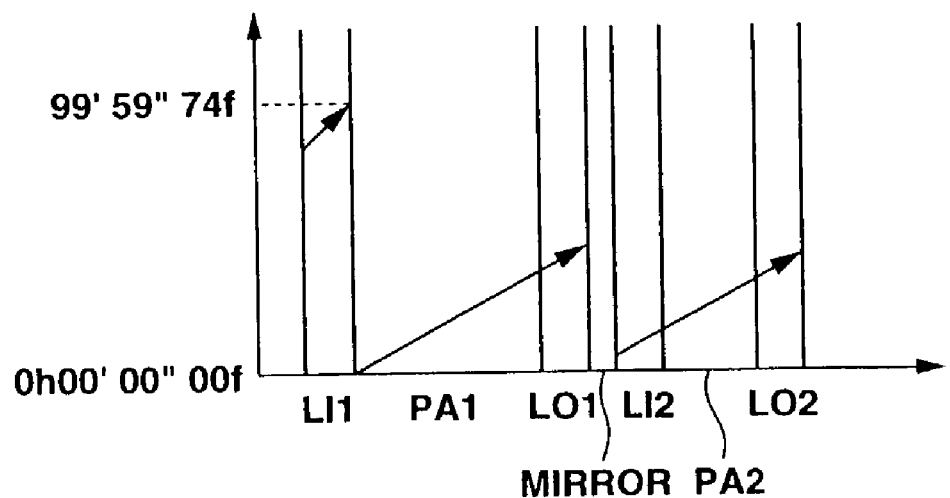
FIG. 8 illustrates the address information of an optical disc embodying the present invention.

In an optical disc 1, in the first section 2 of which data is recorded with the format for the Compact Disc and in the second section 4 of which data is recorded with the format with a recording density higher than for the first section 2, for example, at a double recording density, address data are accorded so as to be sequentially incremented from the inner rim of the lead-in area 2*a* so that the time elapsed TIME as the address data of the lead-in area 2*a* of the inner rim side of the first section 2 will be terminated at 99 minutes 59 seconds 74 frames as a maximum value of the Compact Disc standard, as shown in FIG. 8. In the optical disc 1, the absolute time ATIME as address data of the data area 2*b* and the lead-out area 2*c* of the first section 2 are accorded so as to be started from the address information corresponding to the data area of 0 minute, so that the absolute time ATIME will be sequentially incremented from the inner rim of the data area 2*b*. That is, address data are accorded to the first section 2 of the optical disc in the same manner as in the Compact Disc.

The second section 4 of the optical disc 1 is provided with the elapsed time TIME as address data of the lead-in area 4*a* and with the absolute time ATIME as the address data of the data area 4*b* in continuation from the lead-in area 4*a* as address information. That is, address data are accorded in the second section 4 of the optical disc 1 in the same way as in the single section optical disc in the entire recording area of which data has been recorded at a recording density higher than in the first section 2, that is at a double recording density, as shown in FIG. 7.

The address data recorded as time information is repeatedly recorded a plural number of times of repetition in the lead-in area 4*a* and is offset in an amount corresponding to the length of a repetition unit, for matching to the single-section optical disc shown in FIG. 7.

With the optical disc 1, described above, address data are accorded to the first section 2 and to the second section 4 independently from each other. This allows for facilitated authoring operations for an optical disc.

Figure 9:
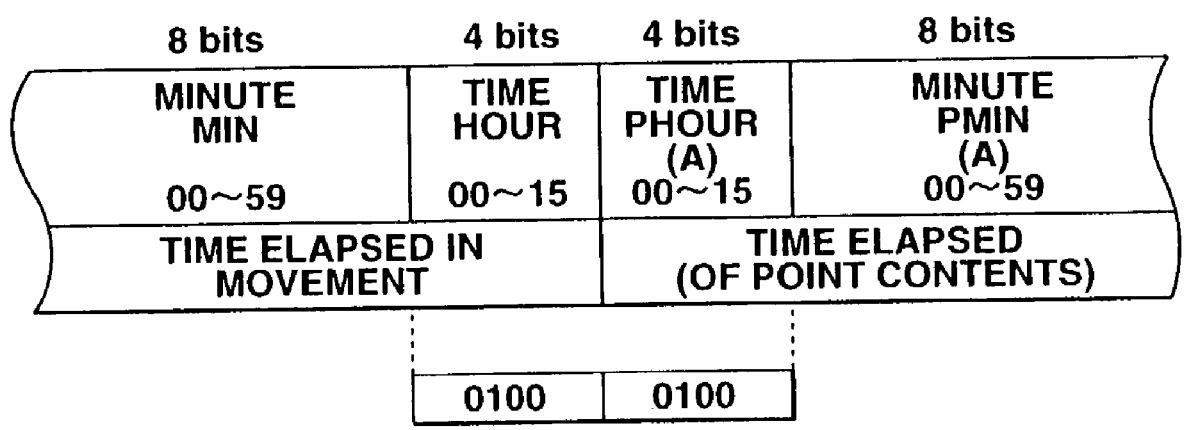
FIG. 9 illustrates identification data.

In at least one of the data parts relevant to the hour HOUR and the hour PHOUR of the Q-channel subcode data of the lead-in area 4*a* of the second section 4, shown in FIG. 4, and the data part relevant to the hour HOUR and the hour AHOUR of the data area 4*b* and the lead-out area 4*c*, shown in FIG. 5, there is recorded identification data for discriminating the first section 2 and the second section 4 from each other. As this identification data, address data indicating the time longer than the maximum recordable time of the second section 4, that is, data indicating time, is used. For example, if the time information as address data is two hours and thirty minutes up to three hours at the maximum, as usual, time data indicating four hours, that is [1] in the second bit, is recorded, as shown in FIG. 9, in at least one of the data parts relevant to the hour HOUR and the hour PHOUR of the Q-channel subcode data of the lead-in area 4*a* of the second section 4, shown in FIG. 4, and the data part relevant to the hour HOUR and the hour AHOUR of the data area 4*b* and the lead-out area 4*c*, shown in FIG. 5. Thus, the optical disc is able to detect time data indicating the four hours as the identification data by a reproducing device during reproduction. Based on the results of detection of the time data, it can readily be detected whether the section currently reproduced is the first section 2 or the second section 4.

Meanwhile, the identification data, that is the time information indicating the four hours, may be used for discrimination between the optical disc and the Compact Disc or between the optical disc and the single-section optical disc in the entire recording area in which data has been recorded to the same recording density as that of the second section 4.

With the above-described optical disc 1, authoring can be carried out readily by independently according address data for the first section 2 and the second section 4. In addition, it can be discriminated, during reproduction by the reproducing apparatus, whether the section being reproduced is the first section 2 or the second section 4, by addition of the discriminating data to the address information of the second section 4.

The method for producing the optical disc 1, described above, is now explained. For preparing the optical disc 1, a photoresist is coated during the resist coating step on a glass master disc. Then, in the cutting step, a photoresist is exposed to light by the laser light modulated in accordance with the data for recording, for cutting a pit pattern of crests and recesses as a latent image for recording. The glass master disc, on which the pit pattern has been cut, is caused to undergo development and fixation in the photoresist developing and fixing step. As a result, a pattern of crests and recesses appears in the glass mater disc, based on the latent image formed in the glass master disc formed by the cutting. Subsequently, a metal master disc, as a mother disc, is prepared by performing electroless plating on the surface of the glass master disc. A stamper then is produced from the master metal disc in the stamper manufacturing process. A disc substrate then is produced in a substrate manufacturing process by charging synthetic resin exhibiting light transmittance, such as polycarbonate or acryl, in an injection molding device, and by performing injection molding. To one surface of a disc substrate, formed by the above process, a stamper pattern of crests and recesses, that is a pit pattern, formed in the glass master disc, is transcribed. In the next following reflective film forming process, a film of metal, such as aluminum, is formed by a technique, such as sputtering, to produce a reflective film, on a surface of the disc substrate carrying the pit pattern of crests and recesses. In a protective film coating process, an ultraviolet ray curable resin is coated on the reflective film as a thin film. The ultraviolet ray then is illuminated to cure the ultraviolet ray curable resin to form a protective film. A light beam then is illuminated from the disc substrate side not carrying the protective film to read out data.

Meanwhile, the surface of the optical disc 1, to which has been transcribed the pattern of crests and recesses, proves a signal recording surface.

Figure 10:
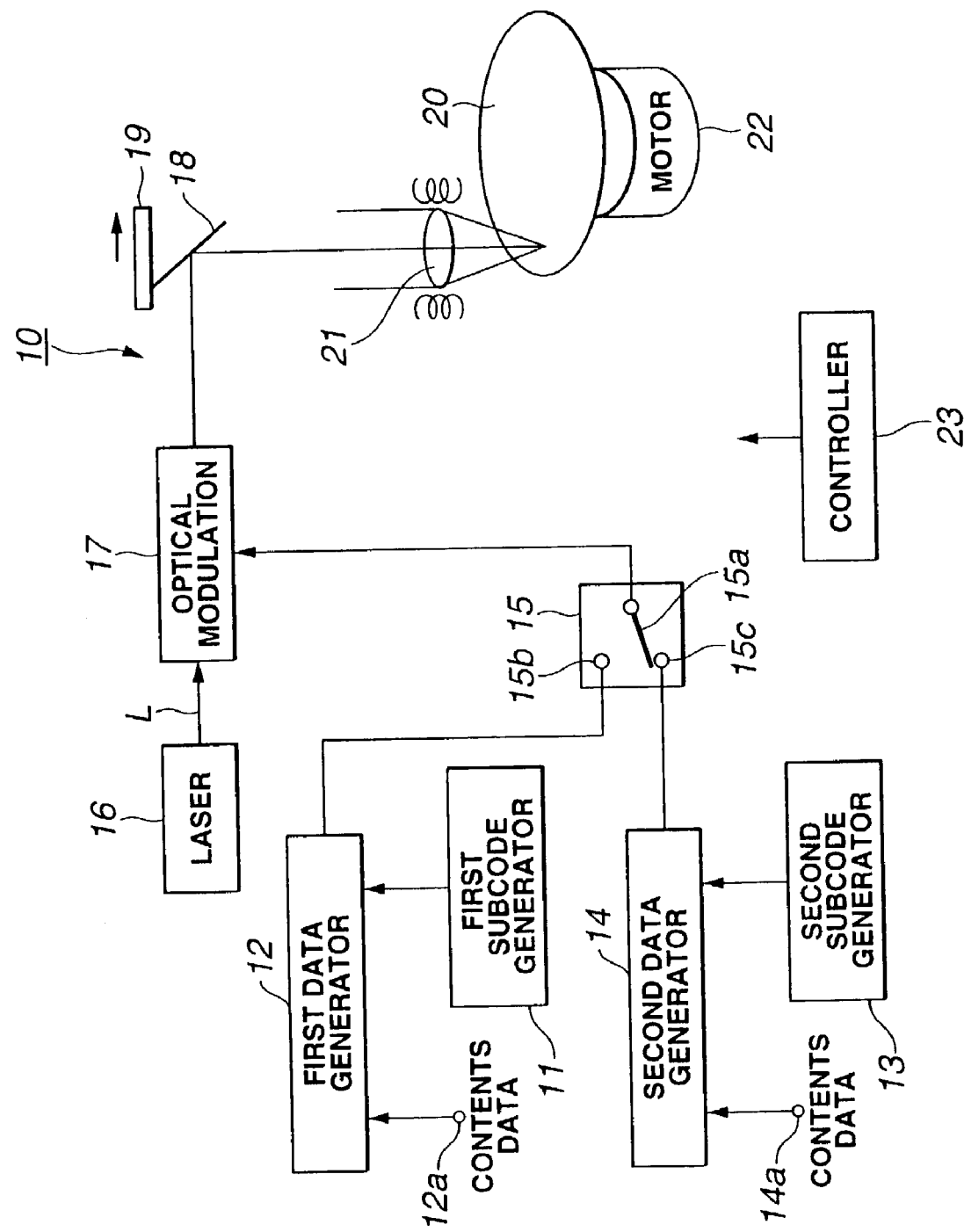
FIG. 10 is a block diagram for illustrating a cutting device.

In the cutting process, a pit pattern of crests and recesses, corresponding to the data for recording, is cut. A cutting device 10 is now explained with reference to FIG. 10. This cutting device 10 is made up by a first subcode generator 11 for generating subcode data for the first section 2, a first data generator 12 for summing contents data for the first section 2 and the subcode data to generate data for recording, a second subcode generator 13 for generating the subcode data for the second section 4, a second data generator 14 for summing the content data for the second section 4 and the subcode data to generate data for recording, and a switching unit 15 for switching between the first data generator 12 and the second data generator 14.

The cutting device 10 includes a laser light source 16, such as a laser device, for radiating the laser light L, an optical modulator 17, comprised, e.g., of an AOM (acoustic optical modulator) or EOM (electric optical modulator) for modulating the laser light beam L, outgoing from the laser light source 16, in accordance with data from the first data generator 12 and from the second data generator 14, a mirror 18 for reflecting the laser light L modulated by the optical modulator 17, a movement mechanism 19 for causing movement of the mirror 18 along the radius of the glass master disc 20, an objective lens 21 for converging the laser light L on a photoresist and for illuminating the glass master disc 20, an electric motor 22 for causing rotation of the glass master disc 20 and a controller 23 for controlling the overall operation of the device 10.

The first subcode generator 11 generates subcode data for data recorded in the first section 2 (FIGS. 2 and 3). To an input terminal 12a of the first data generator 12 are input content data from an external device and subcode data generated in the first subcode generator 11. These data are summed together to generate data to be recorded in the first section 2. The first data generator 12 sends the data through the switching unit 15 to the optical modulator 17.

The second subcode generator 13 generates subcode data for data which is to be recorded in the second section (FIGS. 4 and 5). This second subcode generator 13 generates long time data, longer than the maximum recordable time of the second section 4, that is identification data for discriminating the first section 2 and the second section 4 from each other, to form the identification data in at least one of the data parts relevant to the hour HOUR and the hour PHOUR of the Q-channel subcode data of the lead-in area 4a of the second section 4, shown in FIG. 4, and the data part relevant to the hour HOUR and the hour AHOUR of the data area 4b and the lead-out area 4c, shown in FIG. 5. The second data generator 14 is supplied at its input terminal 14a with the content data from the external device and with the subcode generated in the second subcode generator 13 and sum these data together to generate data to be recorded in the second section 4. The second data generator 14 sends output data through the switching unit 15 to the optical modulator 17.

The switching unit 15 selectively sends the output data from the first data generator 12 and the output data from the second data generator 14 to the optical modulator 17 in accordance with a control signal supplied from the controller 23. That is, in recording data for the first section 2, the switching unit 15 interconnects the first data generator 12 and the optical modulator 17, by a control signal from the controller 23. In recording data for the second section 4, the switching unit 15 interconnects the second data generator 14 and the optical modulator 17, similarly in accordance with a control signal supplied from the controller. For example, when the laser light illuminated and converged by the objective lens 21 on the glass master disc 30 has finished cutting by output data from the first data generator 12 at a preset site on the glass master disc 20, the controller 23 manages control for changing over a movable terminal 15a of the switching unit 15 from a connection terminal 15b to the first data generator 12 to a connection terminal 15c to the second data generator 14 so that output data will be sent from the second data generator 14 to the optical modulator 17.

For recording data on the glass master disc 20, the laser light L radiated from the laser light source 16 falls on the optical modulator 17. For this laser light source 16, a gas laser, such as an argon laser or an He—Cd laser, is used. The optical modulator 17 modulates the laser light radiated from the laser light source 16 based on the output data from the first data generator 12 or the second data generator 14.

On incidence on the mirror 18, the laser light L, modulated by the optical modulator 17, has its optical path deflected by 90°. The mirror 18 is moved along the radius of the glass master disc 20 by the movement mechanism 19 so as to seep the laser light L across the inner and outer rims of the glass master disc 20. The laser light L, deflected by the mirror 18, is converged by the objective lens 21 on the photoresist of the glass master disc 20, which is being rotated by a motor 22 as a rotational driving unit. The objective lens 21 is deflected by an objective lens driving mechanism, not shown, along the optical axis of the objective lens 21, by way of performing focussing control. The result is that data recorded on the first section 2 and data recorded on the second section 4 are cut in the glass master disc 20, so that data may be separately recorded in the first section 2 and the second section 4 using the separate address information.

It should be noted that, during the cutting operation by the laser light of the area of the glass master disc 20 equivalent to the first section 2 of the glass master disc 20, the movement mechanism 19 causes movement of the mirror 18 along the radius of the glass master disc 20 so that the track pitch will be, e.g., 1.6 µm, as described above. When the area of the glass master disc 20 equivalent to the second section 4 is being cut by the laser light, the movement mechanism 19 causes the mirror 18 to be moved long the radius of the glass master disc 20 so that the track pitch will be, e.g., 1.1 µm which is narrower than that in first section 2.

The stamper is formed by the above-described process based on the glass master disc 20 formed by the above-mentioned cutting device 10. The pattern of the stamper presenting micro-irregularities is transcribed to one surface of the glass master disc. The optical disc 1 is completed by a reflective film and a protective film being deposited on the surface of the disc substrate presenting the micro-irregularities (crests and recesses).

With the use of the cutting device 10, described above, an optical disc may be produced in which data recorded as different address data are accorded to the first section 2 and to the second section 4, and in which identification data for discriminating the first section 2 and the second section 4 from each other are recorded as address data for the second section 4.

Figure 11:
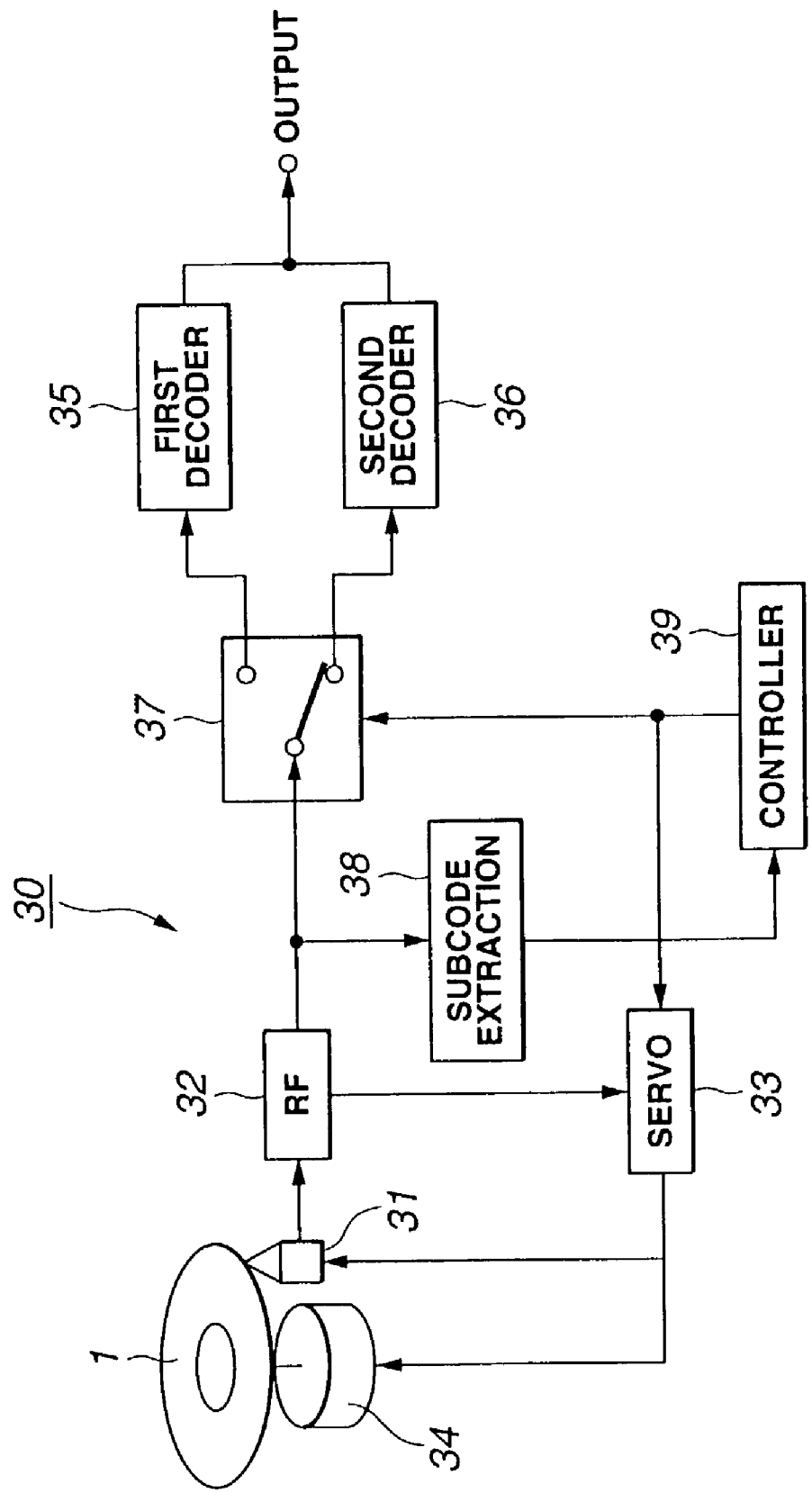
FIG. 11 is a block diagram for illustrating a reproducing apparatus.

Referring to FIG. 11, a reproducing apparatus 30 for the optical disc 1 embodying the present invention is explained. This reproducing apparatus 30 includes an optical pickup 31 for reading out data recorded on the optical disc 1, an RF circuit 32 supplied with an output signal from the optical pickup 31, a servo circuit 33 for generating focusing servo signals and tracking servo signals for the objective lens based on the focussing error signals and the tracking error signals generated by the RF circuit 32, and a driving motor 34 for causing rotation of the optical disc at, for example, a constant linear velocity.

The reproducing apparatus 30 also includes a first decoder 35 for performing decoding operations, such as demodulation, error correction or deinterleaving, on output signals corresponding to signals read out by the optical pickup 31 from the first section 2 of the optical disc 1, from the RF circuit 32, a second decoder 36 for performing decoding operations, such as demodulation, error correction or deinterleaving, on output signals corresponding to signals read out by the optical pickup 31 from the second section 4 of the optical disc 1 from the RF circuit 32, a switching circuit 37 for selectively supplying an output signal of the RF circuit 32 to the first decoder 35 and to the second decoder 36, a subcode extraction circuit 38 for extracting subcode data from an output signal of the RF circuit 32 and a controller 39 for controlling the overall operation of the device 30.

Based on an output signal from a photodetector, not shown, provided on the optical pickup 31, the RF circuit 32 generates RF signals, focussing error signals and tracking error signals. For example, the focussing error signals are generated by a socalled astigmatic method, while tracking error signals are generated by a so-called three-beam method or a push-pull method. The RF circuit 32 outputs RF signals, as output signals, to the first decoder 35 or to the second decoder 36, while outputting focussing error signals and the tracking error signals to the servo circuit 33.

The servo circuit 33 generates servo signals in reproducing the optical disc 1. Specifically, the servo circuit 33 generates focusing servo signals, based on the focussing error signals supplied from the RF circuit 32, so that the focussing error signals will be reduced to [0], while generating tracking servo signals, based on the tracking error signals supplied from the RF circuit 32, so that the tracking error signals will be [0]. The servo circuit 33 outputs the focusing servo signals and the tracking servo signals to a driving circuit of an objective lens driving circuit, not shown, provided on the optical pickup 31. Based on the focusing servo signals and the tracking servo signals, the driving circuit driving-controls the objective lens driving mechanism adapted for driving the objective lens. That is, the objective lens driving mechanism displaces the objective lens in a direction parallel to the optical axis of the objective lens, that is in the focussing direction by driving signals from a driving circuit derived from the focusing servo signals, while displacing the objective lens in a planar direction perpendicular to the optical axis of the objective lens, that is in the tracking direction, by driving signals from a driving circuit derived from the focusing servo signals. Based on output signals of the RF circuit 32, the servo circuit 33 generates servo signals for servo controlling the driving motor 34 and outputs the so generated servo signals to the driving motor 34, to manage driving control to cause rotation of the optical disc 1 at, e.g., a constant linear velocity.

A disc table, not shown, forming a disc rotation driving unit, is provided on a rotary shaft of the driving motor 34. The optical disc 1 is set on and rotated in unison with the disc table.

The first decoder 35 mainly performs decoding of data read out from the first section 2 of the optical disc 1. Specifically, the first decoder 35 demodulates the digital signals, as EFM (eight-to-fourteen modulation) demodulated output signal from the RF circuit 32, and performs decoding processing, inclusive of error detection and detection by CIRC (coss-interleave Reed-Solomon code), on the so demodulated digital signals. If data recorded on the first section 2 is music data, the first decoder 35 outputs the data to a loudspeaker. If data recorded on the first section 2 is video data, the first decoder 35 sends the output data to a monitor. In this manner, the output destination of the output data of the first decoder 35 is changed over or selected based on the type of the data recorded on the first section 2.

The second decoder 36 demodulates the digital signals from the RF circuit 32, recorded on the second section 4 as EFM modulated output signals, and performs decoding processing, inclusive of error detection and correction, based on error correction code, and deinterleaving, on the so demodulated digital signals. Since the data recorded in the second section 4 is encrypted, the second decoder 36 reads out key data recorded in the lead-in area 4a and decrypts the data using the so read out key data. Similarly to the first decoder 35, described above, the second decoder 36 changes over or selects the output destination of output data of the second decoder 36, based on the sort of the data recorded in the second section 4, that is on the sort of the content data.

In reproducing the first section 2 of the optical disc 1, the switching circuit 37 is changed over by a control signal from the controller 39 so that, in reproducing the first section 2 of the optical disc 1, the RF circuit 32 and the first decoder 35 are interconnected for outputting the RF signals as output signals from the RF circuit 32 to the first decoder 35, and so that, in reproducing the second section 4 of the optical disc 1, the RF circuit 32 and the second decoder 36 are interconnected for outputting the RF signals as output signals from the RF circuit 32 to the second decoder 36.

The subcode extraction circuit 38 extracts subcode data of the first and second sections from the RF signals as output signals generated in the RF circuit 32. The subcode extraction circuit 38 outputs the address data and track numbers, extracted from the subcode data, to the controller 39.

The controller 39 outputs address data, track numbers etc., supplied thereto from the subcode extraction circuit 38, to a display unit, for demonstrating the information on, e.g., a monitor. From the address data of subcode data, the controller 39 detects the identification information for discriminating that the section being currently addressed is the second section 4. Specifically, when the first section 2 is being accessed, that is when the first section 2 is being scanned by the optical pickup 31, the identification data is not detected by the controller 39 from the address data. In this manner, the controller 39 is able to recognise and discern that the section currently accessed, that is the section being scanned and read out by the optical pickup 31, is the first section 2. When the second section 4 is being accessed, that is when the section being scanned and read out by the optical pickup 31 is the second section 4, time data longer than the maximum recordable time, that is identification data, can be detected from the address data, so that the controller 39 is able to recognise and discern that the section currently accessed is the second section 4. Based on the recognised or discerned results, the controller 39 controls the switching of the switching circuit 37 for selectively interconnecting the RF circuit 32 and the first or second decoder 36. The controller 39 performs the switching of the switching circuit 37 only when the optical disc 1 is found to be the disc having the second section 4, based on the results of discrimination recorded in the lead-in area 2a of the first section 2, that is based on the discriminated data indicating the presence or absence of the second section 4.

The reproducing operation by the reproducing apparatus 30 is now explained. For example, if the optical disc 1 is loaded on the disc table of the driving motor 34 and the user presses a replay start button forming an operating unit, not shown, provided on the device 30, the controller 39 drives the driving motor 34 so that the optical disc 1 will be driven at, e.g., a constant linear velocity. Simultaneously, the optical pickup 31 illuminates a light beam on a signal recording surface of the optical disc 1. The return light beam, reflected back from the signal recording surface, that is the reflective film, of the optical disc 1, is converted by the photodetector, provided on the optical pickup 31, into electrical signals, which electrical signals are output by the photodetector to the RF circuit 32. The RF circuit 32 generates the RF signals to output the so generated RF signals to the first decoder 35 or to the second decoder 36, while generating focussing error signals and the tracking error signals to output the so generated signals to the servo circuit 33.

The servo circuit 33 generates focusing servo signals, based on the focussing error signals supplied from the RF circuit 32, while generating tracking servo signals based on the tracking error signals supplied from the RF circuit 32. The servo circuit 33 sends these servo signals to the driving circuit for the objective lens driving mechanism constituting the optical pickup 31. The objective lens driving mechanism constituting the optical pickup 31 may be driven in this manner for displacing the objective lens along the optical axis of the light beam, that is in the focussing direction, by way of performing focussing control, while the objective lens driving mechanism may be driven for displacing the objective lens along a planar direction perpendicular to the optical axis of the light beam, that is in the tracking direction, by way of performing tracking control.

The subcode extraction circuit 38 extracts the subcode data from the RF signals, output from the RF circuit 32, to send the so extracted data to the controller 37, which controller 37 then controls the overall operation of the reproducing device 30, based on the subcode data supplied thereto. For example, when the identification data testifying to the second section 4 has been detected from the identification data, the controller 37 is changed over for interconnecting the RF circuit 32 and the second decoder 36. When the identification data has not been detected, the controller 37 is changed over for interconnecting the RF circuit 32 and the first decoder 35. The first decoder 35 or the second decoder 36 decodes the input data to send the output data to the loudspeaker or to the monitor.

With the above-described reproducing device 30, it can be discriminated whether the section currently reproduced is the first section 2 or the second section 4, by detecting the identification data for the address data, even if the optical disc is the optical disc 1 in which the address data accorded to the first section 2 differs from that accorded to the second section 4, thus enabling reproduction of data which is in agreement with the formats of the respective sections.

Meanwhile, the discrimination data contained in the address data of the optical disc 1 may be used for distinguishing the optical disc 1 and a single-section optical disc in the entire recording area of which data has been recorded to the same recording density as that for the second section 4. If, in this case, the identification data has been detected, the controller 39 performs the processing to be performed for the optical disc 1, that is same decoding processing as that performed for the second section 4.

The identification data contained in the address data for the optical disc 1 may also be used for distinguishing the optical disc 1 from the Compact Disc. If, in this case, the identification data has been detected, the controller 39 performs the processing to be performed for the optical disc 1, in addition to managing control for changing over the switching circuit 37 for employing the second decoder 36 as the decoder. If conversely the identification data has not been found or has been unable to be found, the controller 39 manages control for changing over the switching circuit 37 for employing the first decoder 35 as the decoder, while also performed processing for the Compact Disc.

Meanwhile, the format used for the first section 2 of the optical disc 1 may be such a format which is based on CD-DA (Compact Disc Digital Audio), CD-ROM (Compact Disc Read-Only memory) or on DVD (Digital Versatile Disc). The optical disc 1 may not be a replay-only optical disc but may also be a recordable optical disc, such as CD-R (Compact Disc Recordable) or CD-RW (Compact Disc Rewritable).

According to the present invention, the address information is accorded independently for the inner rim side section and for the outer rim side section, for facilitating the authoring. By adding the identification data to the address data, a reproducing device is able to discern whether the section currently reproduced is the inner rim side section or the outer rim side section.

The invention claimed is:

1. A recording medium, comprising:
a first recording area in which data is recorded, said first recording area including a first lead-in area, a first data area and a first lead-out area;
a second recording area in which data having allocated thereto address data different from address data allocated to the data recorded in said first recording area is recorded, said second recording area including a second lead-in area, a second data area and a second lead-out area; and
identification data recorded in said second recording area for distinguishing said first recording area from said second recording area, the identification data including address data indicating a length of time greater than the maximum recordable time of said second recording area,
wherein the address data allocated to data recorded in said first recording area begins from zero as a leading position of said first data area and the address data allocated to data recorded in said second recording area begins from zero as a leading position of said second data area.

2. A recording medium, comprising:
a first recording area in which data is recorded, said first recording area including a first lead-in area, a first data area and a first lead-out area;
a second recording area in which data having allocated thereto address data different from address data allocated to the data recorded in said first recording area is recorded, said second recording area including a second lead-in area, a second data area and a second lead-out area, the address data allocated to data recorded in said second recording area including time data; and identification data recorded in said second recording area for distinguishing said first recording area from said second recording area, the identification data including address data indicating a length of time greater than the maximum recordable time of said second recording area, wherein the address data allocated to data recorded in said first recording area begins from zero as a leading position of said first data area and the address data allocated to data recorded in said second recording area begins from zero as a leading position of said second lead-in area.

3. A reproducing apparatus for a recording medium, comprising:

a head unit for reading out data from a recording medium, the recording medium including a first recording area in which data is recorded in a first format, a second recording area in which data is recorded in a second format different from the first format, the second recording area being recorded with data having allocated thereto address data different from address data allocated to the data in the first format, and identification data recorded in the second recording area for distinguishing the first recording area from the second recording area, the identification data including address data indicating a length of time greater than the maximum recordable time of said second recording area;

an extraction unit for extracting the identification data from the data read out from the recording medium by said head unit;

a first decoder for decoding the data read out by said head unit from the first recording area;

a second decoder for decoding the data read out by said head unit from the second recording area; and a switching controlling unit for supplying the data read out by said head unit from the recording medium to said second decoder when the identification data extracted from said extraction unit indicates the second recording area, said switching controlling unit including a switching unit for selectively supplying the data read out by said head unit from the recording medium to said first decoder or to said second decoder, and a controlling unit for changing over said switching unit for supplying data read out by said head unit from the recording medium to said second decoder when the identification data extracted by said extraction unit indicates the second recording area.

4. A recording apparatus for a recording medium, comprising:

a laser light source producing laser light;

a first data generating unit for generating first data consistent with a first format from data supplied thereto, the first data having first address data allocated thereto;

a second data generating unit for generating, from data supplied thereto, second data consistent with a second format different from the first format and identification data, the second data having second address data different from the first address data allocated thereto, and the identification data including address data indicating a length of time greater than the maximum recordable time of a second recording area;

a modulating unit for modulating the laser light from said laser light source based on one of output data from said first data generating unit and output data from said second data generating unit; and a head unit including an objective lens for converging the laser light modulated by said modulating unit on a recording medium;

the recording medium being formed with a first recording area having a first data area based on output data from said first data generating unit and the second recording area having a second data area based on output data from said second data generating unit, the first recording area being formed with a first lead-in area and a first lead-out area, and the second recording area being formed with a second lead-in area and a second lead-out area, wherein the first address data begins with zero as a leading end of the first data area and the second address data begins with zero as a leading end of the second lead-in area.

5. A method for recording on a recording medium, comprising:

generating first data consistent with a first format from first supplied data, and allocated first address data to the first data;

generating second data consistent with a second format different from the first format and identification data from the supplied data, and allocating second address data different from the first address data to the second data, the identification data including address data indicating a length of time greater than the maximum recordable time of a second recording area;

modulating laser light from a laser light source based on output data formed of one of the first data and the second data;

converging the modulated laser light on a recording medium using an objective lens;

forming a first recording area including a first data area on the recording medium based on the first data, the first recording area being formed with a first lead-in area and a first lead-out area;

forming the second recording area including a second data area on the recording medium based on the second data, the second recording area being formed with a second lead-in area and a second lead-out area, wherein the first address data begins from zero as a leading position of the first data area and the second address data begins from zero as a leading position of the second data area.

* * * * *